(12) United States Patent
Brown

(10) Patent No.: US 6,886,496 B1
(45) Date of Patent: May 3, 2005

(54) PET CHEW TOY

(76) Inventor: Van H. Brown, 130 Springwood La., Andrews, NC (US) 28901

(*) Notice: Subject to any disclaimer, the term of this patent is extended or adjusted under 35 U.S.C. 154(b) by 0 days.

(21) Appl. No.: 10/661,201

(22) Filed: Sep. 12, 2003

Related U.S. Application Data

(60) Provisional application No. 60/410,098, filed on Sep. 12, 2002.

(51) Int. Cl.[7] .............................................. A01K 29/00
(52) U.S. Cl. ....................................................... 119/710
(58) Field of Search ................................. 119/710, 711, 119/709; 426/92, 635, 805, 807

(56) References Cited

U.S. PATENT DOCUMENTS 2,988,045 A    6/1961  Fisher
4,260,635 A *  4/1981  Fisher ............................ 426/3
5,339,771 A *  8/1994  Axelrod ........................ 119/710
5,673,653 A   10/1997  Sherrill
5,897,893 A *  4/1999  Mohilef ......................... 426/89
6,165,474 A * 12/2000  Frudakis et al. ............. 424/737
6,223,693 B1 * 5/2001  Perlberg et al. .............. 119/707
6,238,715 B1 * 5/2001  Baikie ........................... 426/92
6,277,420 B1   8/2001  Andersen et al.
6,584,938 B2 * 7/2003  Sherrill et al. ............... 119/710
2002/0142079 A1 10/2002 Chong

* cited by examiner

Primary Examiner—Yvonne R. Abbott
(74) Attorney, Agent, or Firm—Schwartz Law Firm P.C.

(57) ABSTRACT

A pet chew toy includes a relatively hard outer shell formed of dried and shaped animal skin. A relatively soft flavored and scented meat product is encapsulated within the outer shell. The meat product promotes aggressive sustained chewing of the toy to exercise the jaws of the pet and clean its teeth and gums.

16 Claims, 4 Drawing Sheets

PET CHEW TOY

This application claims the benefit of Provisional Application No. 60/410,098, filed Sep. 12, 2002.

TECHNICAL FIELD AND BACKGROUND OF INVENTION

This invention relates to an improved pet chew toy, and more specifically to a chew toy formed of tough dried animal hide, such as pork skin, with a softer encapsulated meat center. The invention is manufactured in a variety of shapes and sizes common in the industry. Standard commercial chew toys are designed to exercise the jaws of the pet, and clean its teeth and gums. These products are typically dry and tasteless, and generally unappealing to the pet. Other chew toys incorporate a high percentage of soft meat, and have a relatively short chew life. These products likewise provide little jaw exercise and teeth cleaning.

Traditional rawhide dog chews, such as described in U.S. Pat. No. 2,988,045, are made with bovine rawhide. In manufacturing, the hide is first fleshed to remove surface fat, de-haired, and then split to a desired thickness. The top portion or grain is used for leather while the bottom portion or "split" is used for rawhide dog chews. Since the entire hide is exposed to the de-hairing process using chemicals such as hydrated lime, sodium hydra sulfide, and ammonia sulfate, the resulting processed material has a generally unappealing taste ranging from chemical/bitter to bland. The material is further treated with hydrogen peroxide for whitening and/or expansion or "puffing". The hide is then shaped by hand and dried or dry-pressed by machine into numerous shapes for dog chew toys. Pieces of the rawhide may also be ground and glued with gelatin into multiple different shapes and products. In all of the above processing, little attention is paid to the taste of the rawhide chew material.

The prior art further teaches a "soft" flavored rawhide made by extruding the product at high temperature and pressure. While improving its desirability and taste, this product is often rapidly consumed by the pet providing little aggressive chewing, and minimal teeth cleaning and jaw exercise.

Other attempts have been made to improve the taste/smell of rawhide chews. One such attempt described in U.S. Pat. No. 5,673,653 adds jerky in layers between sheets of rawhide. A one-half to one-inch wide length of the jerky is exposed to stimulate chewing. In practice, the jerky is generally easily pulled from the chew and consumed separately. This again leaves a tasteless and unattractive product which is of little interest to the pet. Furthermore, the jerky has a bright red artificial color that can stain carpeting, rugs, and other flooring. Other deficiencies of this teaching include the removal of flavor volatiles during dehydration and the impracticality of using highly palatable sugars. The product's taste is further sacrificed by using a tanned bovine hide. Tanned rawhide adds even more chemicals to the product, such as chromium, fungicides, bactericides, and tanning extracts. These chemicals not only destroy the palatability of the chew but may also harm the health of the pet.

Another prior art chew is described in U.S. Pat. No. 6,277,420. According to this prior art, the chew has a ratio of meat to rawhide of 25%–75% up to 75%–25%. Because of the high meat content, this chew more closely resembles a food item which is rapidly consumed, and is of little value in cleaning the teeth and gums. The center of the chew comprises a soft, moist, sugar type treat which would likely stain carpeting and other flooring if dropped during consumption.

The present invention addresses these and other limitations of the prior art by providing an improved pet chew toy which is highly palatable and desirable, and which incorporates a high percentage of extremely tough chew media. The invention achieves the ultimate goal—to encourage hours of aggressive, sustained chewing. This activity exercises the jaws, cleans the teeth and gums, and satisfies the pet's natural urge to chew. The invention offers increased chew life without sacrificing taste.

SUMMARY OF INVENTION

Therefore, it is an object of the invention to provide a pet chew toy which encourages the pet to aggressively chew for long periods of time until the toy is completely consumed.

It is another object of the invention to provide a pet chew toy which is highly palatable.

It is another object of the invention to provide a pet chew toy which exercises the jaws of the pet.

It is another object of the invention to provide a pet chew toy which effectively cleans the teeth and gums of the pet.

It is another object of the invention to provide a pet chew toy which satisfies the pet's natural urge to chew.

It is another object of the invention to provide a pet chew toy which comprises dried low-fat pork skin which is relatively hard and extremely tough.

It is another object of the invention to provide a pet chew toy which has a flavorful outside coating.

It is another object of the invention to provide a pet chew toy which includes an encapsulated jerky center.

It is another object of the invention to provide a pet chew toy which causes little or no staining on carpeting, rugs and other flooring.

It is another object of the invention to provide a pet chew toy which is long lasting.

It is another object of the invention to provide a pet chew toy that will last for up to 3–4 hours of sustained aggressive chewing.

It is another object of the invention to provide a pet chew toy which has relatively little meaty filling.

These and other objects of the present invention are achieved in the preferred embodiments disclosed below by providing a pet chew toy. The chew toy includes a relatively hard and tough outer shell formed of dried and shaped animal skin. A relatively soft flavored and scented meat product is encapsulated within the outer shell. The meat product promotes aggressive sustained chewing of the toy to exercise the jaws of the pet and clean its teeth and gums.

The term "relatively hard" means that the outer shell is harder than the encapsulated meat product. The term "relatively soft" means that the encapsulated meat product is softer than the outer shell.

The term "encapsulated" means that the meat product is substantially entirely concealed within the outer chew shell. In some embodiments of the invention, less than 5% of the meat product may be inadvertently exposed as a result of the manufacturing process.

According to another preferred embodiment of the invention, a flavored coating is applied to the outer shell to enhance the taste of the toy.

According to another preferred embodiment of the invention, the flavored coating includes a meat digest.

Preferably, the outer shell is formed of pork skin.

According to another preferred embodiment of the invention, the pork skin has less than 10% fat by weight.

Preferably, the pork skin has approximately 5% fat by weight.

According to another preferred embodiment of the invention, the pork skin includes a flavor additive.

According to another preferred embodiment of the invention, the favor additive includes a synthetic sweetener.

Preferably, the meat product comprises jerky.

According to another preferred embodiment of the invention, the ratio of jerky to outer shell is between 5% and 15% by weight.

According to another preferred embodiment of the invention, the jerky includes a vitamin supplement, breath freshener, and/or joint medication to benefit the health of the pet.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
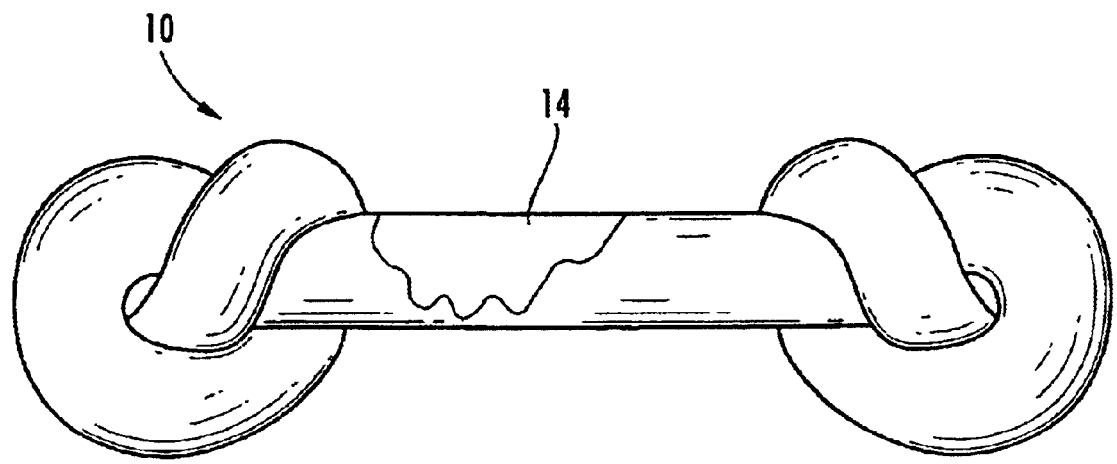
FIG. 1 is a view of a knotted bone pet chew toy according to one preferred embodiment of the present invention.
Figure 2:
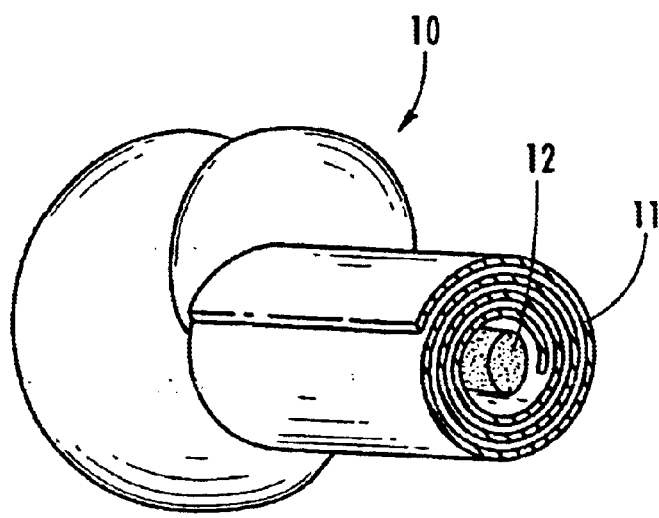
FIG. 2 is a cross-sectional view of the knotted bone chew toy.

Referring now specifically to the drawings, a pet chew toy according to the present invention is illustrated in FIG. 1, and shown generally at reference numeral 10. The chew toy 10 is formed in a knotted bone, and includes a relatively hard and tough outer shell 11 comprising wrapped layers of flavored chew media and a softer inner meat product 12. After hours of chewing, the tough outer shell 11 softens and becomes increasingly chewy. The meat product 12 is substantially entirely encapsulated inside the outer shell 11, and cannot be separated and consumed by the pet without first chewing through the outer shell 11. The strong appealing scent of the encapsulated meat product 12 along with the improved flavor of the outer chew shell 11 encourages hours of aggressive, sustained chewing of the tough outer shell 11 which exercises the jaws, cleans the teeth and gums, and satisfies the pet's natural urge to chew. Once the outer shell 11 is penetrated, the pet is rewarded with the softer and highly palatable meat center 12.

The chew toy 10 has three primary components—the flavor enhanced outer shell 11, the encapsulated meat product 12, and a flavored coating applied to the outer shell 14. These components cooperate to form a chew toy 10 which is flavorful and appealing to the pet, and which has a substantially long-lasting chew life. Each of the above components is discussed separately below.

Outer Chew Shell 11

The present chew media of the outer shell 11 comprises a flavored reduced-fat pork skin. Pork skin is generally more palatable than bovine rawhide common in most prior art chews. Prior to tanning bovine hide, harsh and bitter chemicals are generally used in the de-fatting and de-hairing processes. As mentioned above, this often results in a generally tasteless and even bitter chew media. The primary means for de-hairing pork skin involves hot water and mechanical shearing. This relatively simple process leaves no harsh chemical tastes. De-fatting is done with enzymes and/or non-ionic detergents—a process known in the industry. The overall fat content of the pork hide is reduced to about 5%. A lower fat hide has several advantages including: (1) a non-greasy touch to the consumer; (2) a better media surface for adhering coatings; (3) less fat consumed by the pet; (4) a better media for absorbing other flavors; (5) a tougher chew media for the pet; and (6) easier forming and adherence of pressure formed chew toys.

The reduced-fat pork hide is further processed to add flavor. For flavor absorption, the hide is either air or oven dried at low temperatures. The hide is optionally pre-treated with hydrogen peroxide to whiten and sterilize before drying. Following the drying process, the hide is cut to the desired shapes used in creating the various commercial products. The dried pieces are then re-hydrated with a select flavor solution. To add a sweet taste to the pork skin, the flavor solution may include a synthetic sugar, such as Dry Super Synersweet™. This concentrated synthetic sugar requires only a small amount of absorption (11b being equivalent to 150 lbs of natural sugar). Absorption of about 8–10% water yields a hide which is relatively soft and flexible for shaping and tying. A solution of 0.3–0.5% Super Synersweet™ is easily absorbed. To achieve an equivalent level of sweetness using natural sugar, the flavor solution would require 50% sugar which would be essentially impossible for the pork skin to absorb, and due to its tackiness, would make the material nearly impossible to handle and shape. Other concentrated water-soluble and/or some fat-soluble flavors can be added to the solution and incorporated into the pork skin during re-hydration. A meat digest, such as described below, can also be incorporated in this same manner.

An alternative method which more rapidly absorbs flavors into the pork skin is vacuum tumbling. The dried pork skins are re-hydrated using a commercially available vacuum tumbler. The dried skin and liquid flavor solution are added to the tumbler and a vacuum drawn on the vessel. The tumbling and vacuum force cause absorption in about ⅓ the time of traditional re-hydration methods. Absorption is also generally more complete and uniform throughout the hide. The process continues until the hide is sufficiently pliable for manufacturing product or until the hide is fully saturated. In the case of full saturation, the hide is dried fully and re-hydrated again for manipulation. Vacuum processing is especially applicable for adding a meat digest to the hide, since synthetic sugar is more easily absorbed at acceptable levels by using traditional re-hydration methods. Added flavor (around 2–3% on a dry weight basis) offers dramatic palatability improvement over untreated fat-reduced pork skin.

Encapsulated Meat Product 12

The encapsulated meat product 12 comprises a highly palatable jerky "rod" placed in the center of the chew toy 10 during the manufacturing process. The jerky is made from select flavored ingredients that are especially appetizing to the pet. Depending on the type of chew toy 10, the rod may be flattened and shaped in various ways to accommodate the particular design. Since a dog's sense of smell is about 300–400 times better than a human, the encapsulated jerky product 12 will be extremely attractive to the pet as it chews the tough outer shell 11 of the chew toy 10.

According to one embodiment, the jerky meat product 12 includes:

| | |
|---|---|
| Beef Tripe | 25.0% |
| Chicken | 16.3% |
| Beef Hearts | 16.3% |
| Soy Grits | 18.0% |
| Red Sugar | 8.0% |
| Molasses | 5.0% |
| Dried Brewers Yeast | 5.0% |
| Garlic Oil | 0.3% |
| Potassium Sorbate | 0.4% |
| Spice Pak | 0.1% |
| Liquid Smoke | 0.6% |
| Propylene glycol | 2.0% |
| Salt | 3.0% |

The primary "high flavor" element of the above combination is beef tripe. Since beef tripe alone is extremely smelly, the key is to formulate a product that is highly palatable to the pet but not offensive to the owner.

The meat product 12 is manufactured through a cold extrusion process. After cold extrusion, the product 12 is dried in an oven at 170 degrees for about 4–5 hours until the water activity level is 0.8 or less. After cooling, the product 12 is packed in lengths of about 30 inches for shipment and subsequent incorporation in the outer chew shell 11. The knotted bone chew toy 10 is hand tied with the meat product 12 entirely encapsulated in the center and extending from one end of the chew toy 10 to the other. Preferably, no portion of the meat product 12 is exposed or visible in this embodiment. The typical ratio of meat product 12 to outer chew shell 11 is about 10% to 90%. Additionally, a vitamin supplement can be added to the meat product 12 to enhance the overall health benefits of the chew toy 10. Product testing has shown that when the chew toy 10 is properly sized, the pet will remain with the chew toy 10 for 3–4 hours and will rarely leave the product until it is totally consumed.

Chew Shell Coating 14.

For added appeal, the chew toy 10 may include a flavor coating 14 applied to the outer chew shell 11 and covering either all or a lesser portion of the chew toy 10. In formulating the present coating 14, the object was to combine ingredients that would survive the long dehydration process and remain highly palatable. The most successful formulation comprised a digested meat or combination of meats included in a sweet (sugar, molasses) base accompanied by starch binders. A typical formulation is as follows:

Preparation of Digest:
600 lbs pork hearts
400 lbs poultry vicera.

This combination was emulsified, the pH adjusted to 7.5 with NaOH, and an enzyme added (0.1% Flavourzyme 500L—Novozymes). The combination was heated in a hot water-jacketed reactor with moderate mixing until the temperature reached 135° F. for 2 hrs. Next, another enzyme (0.1% Alcalase 2.4 L FG) was added to the mixture and allowed to digest for 1 hour with the temperature increased to 150° F. Following the digestion time, the reaction was quenched by reducing the pH to 3.0 with phosphoric acid. While hot, the mixture was filtered through a 60-mesh stainless steel screen to remove any undigested products. The resulting mixture may be stored for later use or returned to the reactor for completion of the coating 14.

Any meat or poultry combination can be used to derive a digest for use in the present coating 14. A typical coating formulation is as follows:

| | |
|---|---|
| 50% | Digest (meat) |
| 10% | Cane Molasses |
| 15% | Cane Sugar |
| 12% | Instant Pure-Cote B792 |
| 5% | Maltodextrose M-500 |
| 5% | Dextrose |
| 2% | Salt |
| 0.3% | Liquid Smoke |
| 0.1% | Garlic Oil |
| 0.4% | Potassium Sorbate |
| 0.2% | Naturox |

The coating 14 can be applied to the outer shell 11 as a hot spray, or a diluted cold dip. The desired coating thickness will be determined based on the particular application usually ranging from 5–8% by weight as a dry basis. Once dried, the coating 14 has a high aesthetic sheen which generally appeals to the pet owner.

While typical coating formulations have added color and may cause slight staining on a light carpet or rug, these stains are no more significant than that caused by standard commercial dog food. If a clear and entirely non-staining chew toy is desired, a clear coating 14 can be formulated as follows:

| | |
|---|---|
| 50% | Water |
| 25% | Cane sugar |
| 12% | Instant Pure-Cote B792 |
| 10% | Maltodextrose M-500 |
| 1.4% | Concentrated Flavor |
| 1% | Salt |
| 0.4% | Potassium Sorbate |
| 0.2% | Naturox |

The coating 14 can be flavored with many different natural or synthetic flavor concentrates to provide the desired result. This may range from a simple smoke or garlic flavor to any commercially available concentrated cheese, chicken, or liver beef stew, such as those available from Feed Flavors, Inc. of Wheeling, Ill.

Alternative Embodiments

Figure 3:
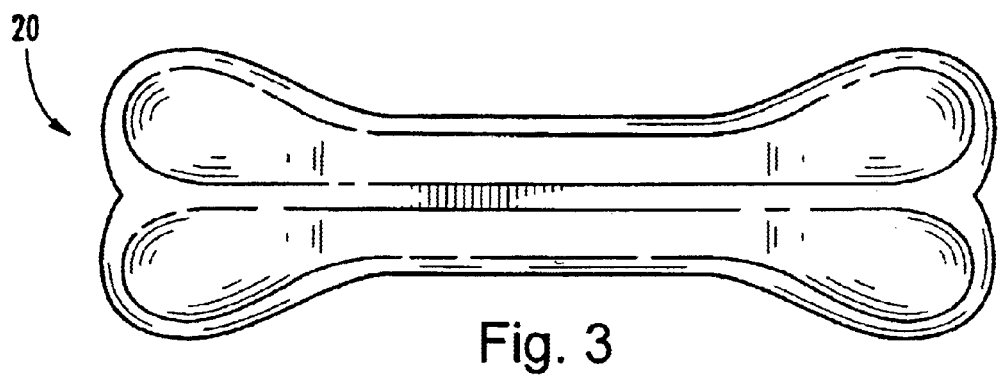
FIG. 3 is a plan view of a pressed bone chew toy according to a second embodiment of the present invention.
Figure 4:
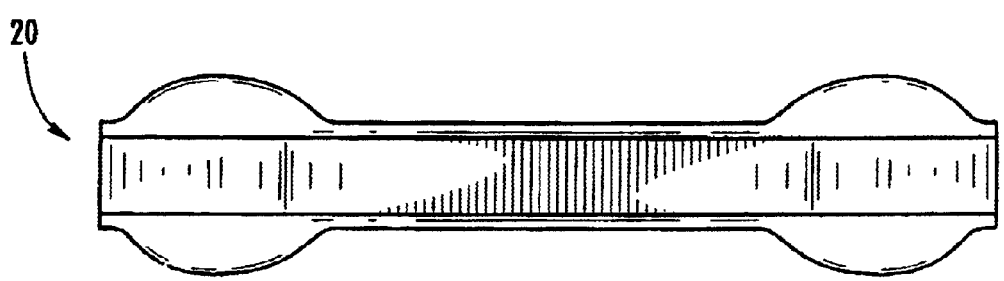
FIG. 4 is a side view of the pressed bone chew toy.
Figure 5:
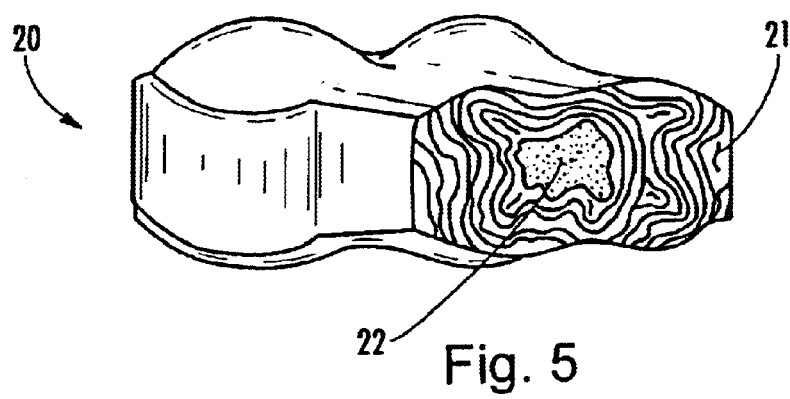
FIG. 5 is a cross-sectional view of the pressed bone chew toy.

Alternative embodiments of a chew toy according to the present invention are shown in FIGS. 3–10. FIGS. 3, 4, and 5 illustrate a pressed bone chew toy 20 which includes a relatively hard outer shell 21 comprising layers of tough chew media and a softer highly palatable meat product 22. The outer shell 21 and meat product 22 are manufactured as described above. The chew toy 20 further includes either a meat digest based or meatless clear coating (not shown) applied to the outer shell 21 for added flavor and appeal.

Figure 6:
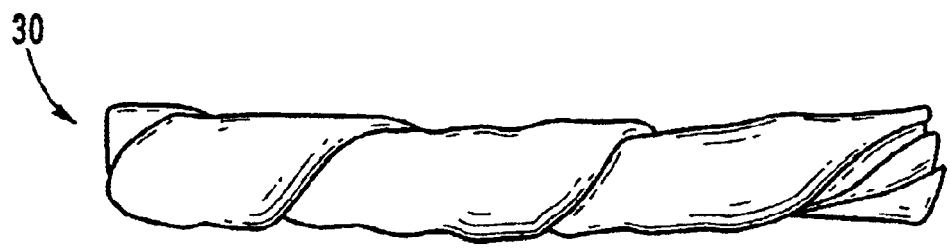
FIG. 6 is a view of a twist chew toy according to a third embodiment of the present invention.
Figure 7:
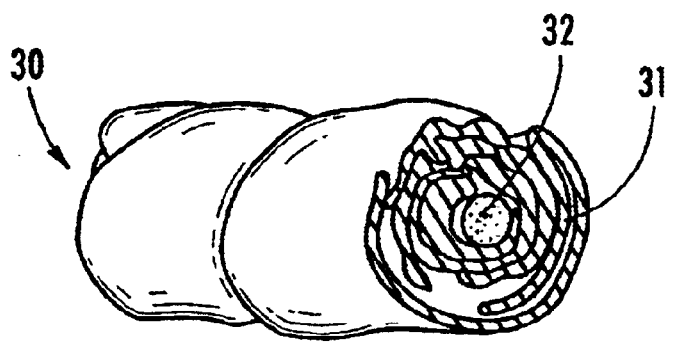
FIG. 7 is a cross-sectional view of the twist chew toy.

FIGS. 6 and 7 illustrate a "twist" chew toy 30 including a relatively hard outer shell 31 comprising layers of tough chew media and a softer highly palatable meat product 32. In manufacturing the twist 30, long strips of pork hide are twisted around the meat product 32 in lengths of about 6 feet. The twisted combination is then secured on a rack which is placed in a low temperature oven (40 degrees C.) for about 34 days to dry very slowly from the inside out.

When fully dry (about 5–6% moisture), the 6-foot lengths are removed from the rack and cut into 6-inch lengths for commercial packaging. In each 6-inch length, a small portion of the meat product 32 is slightly visible at opposite ends of the twist 30. The meat product 32 does not extend beyond the ends of the twist 30, and cannot be separated and removed from the outer shell 31. The composition of the outer shell 31, meat product 32, and coating (not shown) in the chew toy 30 is preferably identical to that previously described.

Figure 8:
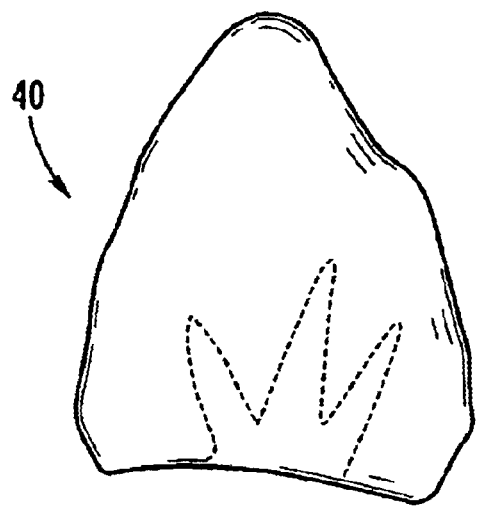
FIG. 8 is a view of a pressed ear chew toy according to a fourth embodiment of the present invention.
Figure 9:
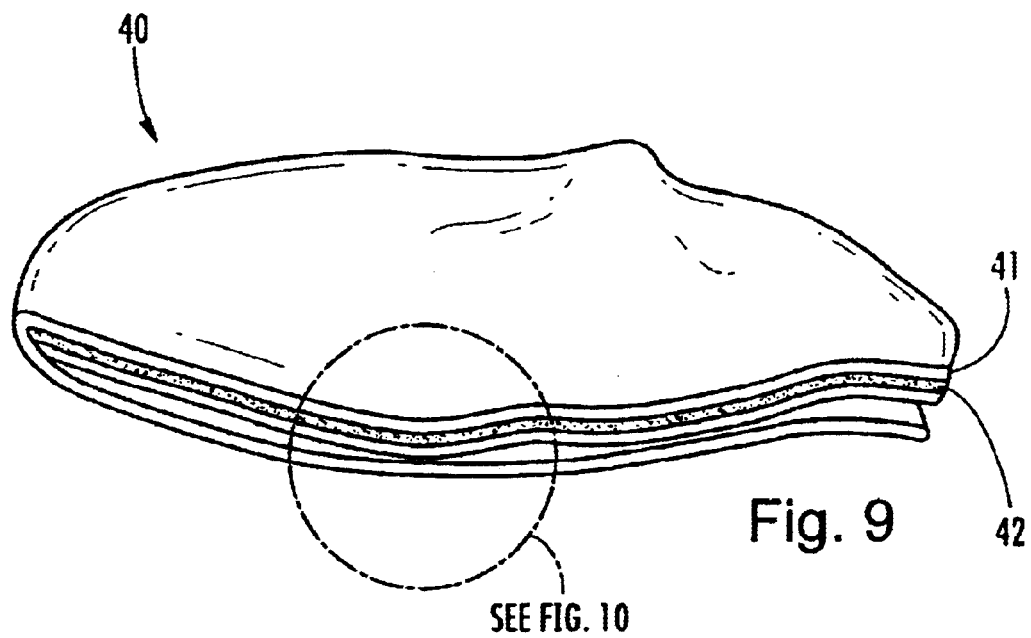
FIG. 9 is a cross-sectional view of the pressed ear chew toy.
Figure 10:
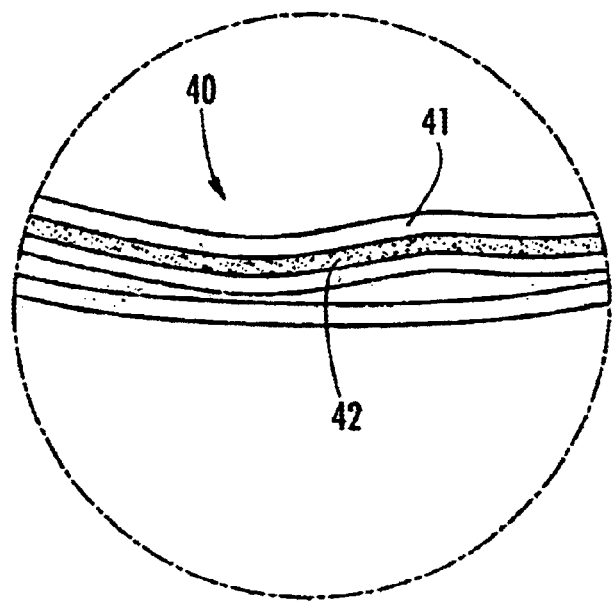
FIG. 10 is an enlarged cross-section of the pressed ear chew toy.

A final embodiment of a chew toy 40 according to the present invention is shown in FIGS. 8, 9, 10. The chew toy 40 is formed in the shape of an ear, and like chew toys 10, 20, and 30, includes a relatively hard outer shell 41 comprising layers of tough chew media and a softer highly palatable meat product 42. In the chew toy 40, the meat product 42 is pressed between the layers of chew media and extends over a surface area corresponding substantially to that of the outer chew shell 41. A small portion of the encapsulated meat product 42 may be slightly visible along one or more edges of the chew toy 40.

A pet chew toy is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

I claim:

1. A pet chew toy, comprising:
   (a) a relatively hard and tough outer shell formed of multiple layers of dried and shaped pork skin; and
   (b) a relatively soft flavored and scented meat product encapsulated within said outer shell, and promoting aggressive sustained chewing of said toy to exercise the jaws of the pet and clean its teeth and gums.

2. A pet chew toy according to claim 1, and comprising a flavored coating applied to said outer shell to enhance the taste of said toy.

3. A pet chew toy according to claim 2, wherein said flavored coating comprises a meat digest.

4. A pet chew toy according to claim 1, wherein said pork skin has less than 10 percent fat by weight.

5. A pet chew toy according to claim 4, wherein said pork skin comprises a flavor additive.

6. A pet chew toy according to claim 5, wherein said flavor additive comprises a synthetic sweetener.

7. A pet chew toy according to claim 1, wherein said meat product comprises jerky.

8. A pet chew toy according to claim 7, wherein the weight ratio of said jerky to said outer shell is between 5 and 15 percent jerky to between 85 and 95 percent outer shell.

9. A pet chew toy according to claim 8, wherein said jerky includes beef tripe.

10. A pet chew toy, comprising:
    (a) a relatively hard and tough outer shell formed of multiple layers of dried and shaped pork skin;
    (b) a relatively soft flavored and scented meat product encapsulated within said outer shell, and promoting aggressive sustained chewing of said toy to exercise the jaws of the pet and clean its teeth and gums, the weight ratio of said meat product to said outer shell being between 5 and 15 percent meat product to between 85 and 95 percent outer shell; and
    (c) a flavored coating applied to said outer shell to enhance the taste of said chew toy.

11. A pet chew toy according to claim 10, wherein said flavored coating comprises a meat digest.

12. A pet chew toy according to claim 10, wherein said pork skin has less than 10 percent fat by weight.

13. A pet chew toy according to claim 12, wherein said pork skin comprises a flavor additive.

14. A pet chew toy according to claim 13, wherein said flavor additive comprises a synthetic sweetener.

15. A pet chew toy according to claim 10, wherein said meat product comprises jerky.

16. A pet chew toy according to claim 15 wherein said jerky includes beef tripe.

* * * * *